United States Patent [19]

Marshall et al.

[11] 4,035,588
[45] July 12, 1977

[54] RIGHT-OF-WAY CONTROL CIRCUIT FOR KEY TELEPHONE INTERCOMMUNICATION SYSTEM

[75] Inventors: Richard A. Marshall, Durham, N.C.;
James W. Smith, Edmonds, Wash.

[73] Assignee: GTE Automatic Electric Laboratories Incorporated, Northlake, Ill.

[21] Appl. No.: 691,107

[22] Filed: May 28, 1976

[51] Int. Cl.² .................................. H04M 1/72
[52] U.S. Cl. .................................. 179/99
[58] Field of Search ............ 179/18 AD, 99, 18 D, 179/18 DA, 81 B

[56] References Cited

U.S. PATENT DOCUMENTS

| | | | |
|---|---|---|---|
| 2,850,579 | 9/1958 | Carter | 179/99 |
| 3,887,774 | 6/1975 | Takubo et al. | 179/99 |
| 3,965,308 | 6/1976 | Jones et al. | 179/99 |

*Primary Examiner*—Kathleen H. Claffy
*Assistant Examiner*—Randall P. Myers
*Attorney, Agent, or Firm*—Robert J. Black

[57] ABSTRACT

A circuit for controlling multiple signalling sources within a key telephone system for the establishment of priorities. The circuit inhibits connection to, or permits disconnection of a secondary signal source from a selected amplifier whenever a primary signal source is connected to the same amplifier. Circuitry is also provided to indicate the disconnect condition.

7 Claims, 1 Drawing Figure

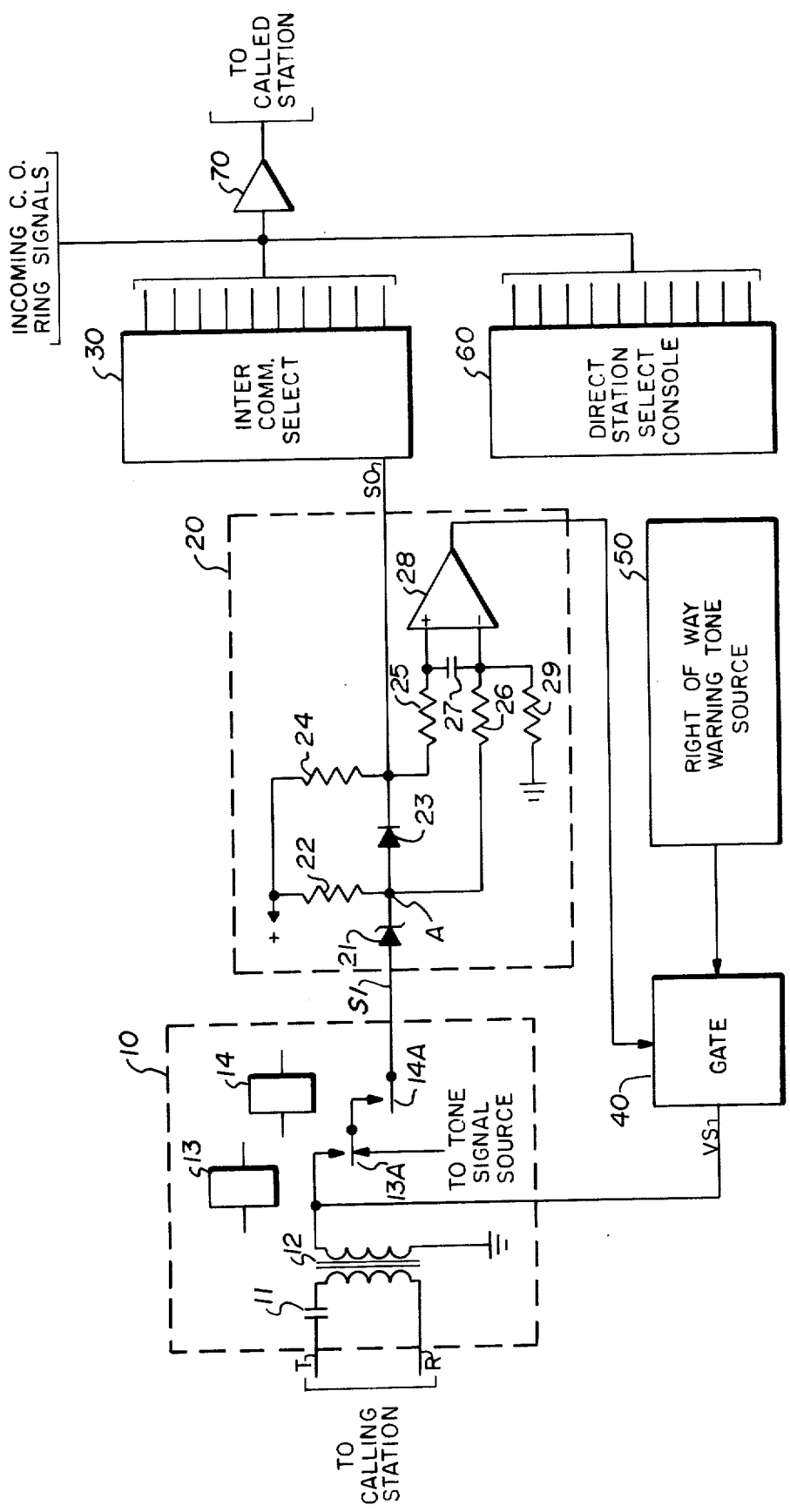

RIGHT-OF-WAY CONTROL CIRCUIT FOR KEY TELEPHONE INTERCOMMUNICATION SYSTEM

BACKGROUND OF THE INVENTION

1. Field of the Invention

The present invention relates to key telephone systems of the type employing common control tone and voice signalling, and more particularly to a right-of-way circuit for determining the priority of different signalling sources in such a system.

2. Description of the Prior Art

In current day key telephone systems tone and voice signalling has become an accepted standard. In such systems electronic amplifiers for each telephone instrument are employed to receive, amplify and acoustically transmit audible tones and voice signals as used in the system. The wiring in such a system is arranged so that individual amplifiers can receive simultaneous audio signals from up to three different sources, i.e.: ringing for calls from a central office or PBX, ringing and voice signalling for intercom calls and voice signalling from a direct station selection (DSS) console. Systems of this type are like the 17A system manufacured by GTE Automatic Electric Incorporated, the COM KEY manufactured by Western Electric Company and the K76 system manufactured by International Telephone and Telegraph.

In systems of this type noted above, electronic amplifiers and associated transducers are incorporated in each telephone of the system to replace the conventional ringer and/or buzzer. Signal tones to indicate incoming central office or PBX or intercom calls and voice messages are transmitted to the amplifiers for the purposes of audible signalling. Because each amplifier can clearly process only one audio message at a time, it is usually necessary to arrange a system so tone or voice signals are sent to an amplifier one at a time. In the WE COM KEY and ITT K76 systems noted above the circuitry is arranged to provide only one voice signal per system at any particular moment. In both systems the intercom calling party can send a voice signal to any other intercom station in the system. In the COM KEY system a DSS console is provided for voice signalling of any amplifier in the system. In the K76 system the confusion of multiple signals is avoided by providing only one voice signalling method, viz., the intercom. The COM KEY system while seeming to provide two methods of voice signalling, through one amplifier (intercom and the DSS) in actuality causes the DSS to use the voice signalling circuitry of the intercom, and provides only one such circuit. Both the COM KEY and K76 systems will process only one voice message at a time as indicated, but tone signalling can occur during a voice signal, causing disruption of the voice message, in the K76. The present circuitry was designed for use in the GTE Automatic Electric's 17A system to permit multiple voice signalling while controlling all system signalling to avoid the possibility of one amplifier receiving tone and voice or two voice messages simultaneously. The present circuitry therefore providing a substantial improvement over the key telephone systems of the prior art.

SUMMARY OF THE INVENTION

The right-of-way control circuit of the present invention is designed for use in a key telephone system like the 17A system described above wherein a selected signalling amplifier may receive input signals from two sources, an intercom selector and a direct station select console. An amplifier circuit associated with a called party station would then thus normally receive both voice signals and combining them into a single audio output. As a result the called party would hear only a mixed signal and be unable to clearly understand either the intercom or DSS voice message.

The present circuitry eliminates such confusion by preventing multiple signals reaching a single amplifier. In operation the right-of-way control circuitry operates to give the direct station select console and other important signalling sources a primary priority to the signalling amplifiers. Intercom signalling is chosen as a secondary source. When a primary and secondary signal source attempt to connect to the same signalling amplifier the "right-of-way" is given to the primary signal. The secondary signal is then temporarily disconnected until the primary signal source is disconnected from the amplifier.

In the present circuit when an intercom signal is interrupted because of a primary signal to the called party, a comparator circuit will sense the disconnect and automatically gate a warning tone back to the intercom signalling party. This tone continues for the entire time the primary signal connection is made. If the calling intercom party remains off hook during this time interval and the primary signal is then disconnected from the signalling amplifier, the right-of-way control circuit of the present invention will automatically disconnect the warning tone and reconnect the signalling path between calling and called intercom stations. The right-of-way circuitry is normally connected between the intercom tone and voice signalling equipment and the intercom select circuitry of the key telephone system with an output providing for gating signals from a right-of-way warning tone source back to a calling party employing an intercom line, through the intercom signalling equipment.

The intercom circuitry includes a zener diode for shifting the voltage level (with respect to ground), of incoming signals from the intercom signalling equipment, a diode adapted to gate a signalling path through from the intercom signalling equipment to intercom selector and comparator circuitry bridging the latter referred to diode to monitor the voltage drop across the diode to determine whether access to the called station amplifier has been made by the direct station's select console or by a central office or PBX ringing signal source. Operation of the comparator circuitry controls the aforementioned gate circuitry to control output of the right-of-way warning tone source to the intercom calling party.

BRIEF DESCRIPTION OF THE DRAWINGS

The single sheet of drawings attached hereto comprise a combined block and schematic circuit diagram of a portion of a key telephone system wherein the right-of-way circuitry of the present invention is included.

DESCRIPTION OF THE PREFERRED EMBODIMENT

Referring now to the accompanying drawing, portions of a 17A key system as manufactured by GTE Automatic Electric Incorporated are shown, incorporating therein the right-of-way circuit of the present invention. Only those portions of the system which relate to the utilization of the right-of-way circuit has been shown. Inasmuch as they do not form a portion of the present invention most of the circuitry of the key telephone system has been shown in block form to clarify the understanding of the operation of the right-of-way circuit. However to further assist in this understanding, a portion of the intercom signalling equipment 10, has also been shown in schematic form.

Included in the intercom signalling equipment 10 is a transformer 12 whose primary is coupled through capacitor 11 to the tip and ring lead (T & R respectively) of a calling station desiring to utilize the intercom circuitry of the present described key system. Also shown are two relays 13 and 14 having associated contacts 13A and 14A respectively. The operating paths of these relays have not been shown inasmuch as they do not form a portion of the present invention. Connections from the secondary of transformer 12 to the right-of-way circuit 20 of the present invention are made through contacts 13A and 14A when relays 13 and 14 are both operated. Signals from an associated tone signal source to provide signalling through the right-of-way circuit 20 and the intercom selector circuit 30 to a desired called station are coupled through the break contact portion of contacts 13A of relay 13 in its non operated condition and the contacts 14A of relay 14. Voice signals are connected when relays 13 and 14 are in the operated condition to the called party over the path previously outlined.

Right-of-way circuit 20 includes zener diode 21 connected to lead S1 which comes from the intercom signalling equipment and diode 23 connected between diode 21 and lead S0 which extends to the intercom select equipment 30. Resistors R22 and R24 which are of the same value, are connected to a source of DC potential with resistor 22 being connected to the junction between zener diode 21 and diode 23 and resistor 24 being connected to the S0 lead extending from diode 23 to the intercom select unit 30. Also included in the right-of-way circuit is a comparator amplifier circuit 28 whose two inputs through resistors 25 and 26 are connected to either side of diode 23. Bridging the two inputs of amplifier 28 is capacitor 27. The output of comparator amplifier 28 is connected to the control input of gate circuit 40. The direct station select console has any one of its outputs connected on a selected basis to a called station through amplifier 70. Also connected to the input of amplifier 70 is a connection to a source of incoming central office or PBX ringing signals.

When a calling station served by a key system described herein wishes to establish a call on an intercom basis appropriate action will take place in the intercom signalling equipment whereby relay 14 will be operated and tone signals extended through the break contact of non operated relay 13 and make contact 14A associated with relay 14 will be connected to the input lead S1 of the right-of-way control circuit 20 in response to control circuitry of the intercom system. Similarly once a connection has been established and the calling party wishes to communicate via the intercom selector to a selected call to station, relay 13 will be operated and then voice signals over leads T & R will be coupled through capacitor 11 and transformer 12 to lead S1 of the right-of-way circuit while signals from the tone signals source will be disconnected at the break contact portion of contacts 13A of relay 13. In either case the alternating current signals presented to the S1 lead are referenced to ground potential so as to cause a DC current to flow from positive voltage through resistor 22 and zener diode 21 into the intercom signalling equipment 10. This current flow forces diode 21 into the zener breakdown region. The result is that all incoming AC signals present on the S1 lead will be shifted positive by the zener voltage of diode 21 when viewed at point A (with respect to ground). The DC potential at point A (the junction of diodes 21 and 23 and resistors 22 and 26), although positive with respect of ground must be significantly negative when compared to the positive voltage source. The potential difference between point A and the positive voltage source may assume in the present embodiment of the invention to be 5 volts or more.

Resistor 24 plus the parallel resistance caused by the input of the paging amplifier 70 will create another current flow through diode 23 so as to forward bias it. When both diodes 21 and 23 are in the low impedance state, the alternating current signals from intercom signalling equipment 10 appearing on lead S1 which are superimposed on the DC voltage, will be level shifted and outputted from the circuit on lead S0 extending to the intercom select circuit 30. The amplifier 70 connected now through intercom select circuit 30 will receive, amplify and reproduce the AC signals in a conventional manner.

When the S0 lead is connected to an amplifier through intercom select circuit 30 currently receiving signals from a different signal source such as ringing signals from a telephone central office or a direct station select call, a switching function will be performed by right-of-way control circuit 20. Other signal sources in the system are designed to output signals that are also referenced to near ground potential. When such a signal source is connected to the S0 lead a DC potential will appear across diode 23 that will force diode 23 into its non conducting state. This non conducting state represents a high impedance between the S1 and S0 leads. This high impedance effectively blocks audio signals from reaching the selected amplifier. If the second signal source is disconnected from the selected amplifier, the potential on lead S0 would rise to the positive source voltage and diode 23 will again be forward biased.

It should be noted that signalling in the present system is carefully referenced to predetermined potentials for proper operation of the circuit. The only function of zener diode 21 is to establish a reference potential at point A. If the reference potential of all intercom signals is chosen to be several volts above ground but still below the positive DC source voltage, diode 21 would be unnecessary to the function of the circuit.

Comparator 28 which is of conventional design, monitors the voltage drop across diode 23 through resistors 25 and 26. Capacitors 27 filters out any high frequency signals to insure reliable operation for the comparator circuit while resistor 29 provides a bias to the comparator when the voltage drop across diode 23 is 0. During normal intercom signals the voltage drop across diode 23 is approximately 0.6 volt (point A being negative with respect to the S0 lead). This voltage drop is presented to the differential inputs of the comparator and the output that results will be near the positive voltage supply potential. If no potential appears across diode 23 resistor 29 will force a slight negative bias potential to be maintained across the comparator input terminals (plus terminal positive with respect to the minus terminal). The comparator output would thus still remain at the positive supply voltage potential.

When the S0 lead is forced to be negative with respect to point A and diode 23 is biased off, comparator 28 will follow with an output near ground potential. During this state, it should be remembered that audio signals will not pass from the S1 to the S0 lead. It is during this state also that the selected amplifier is receiving signals from some signal source (DSS or CO ring) other than the intercom signalling equipment.

The output of comparator 28 is used to control the right-of-way warning gate 40 which functions in a well known manner. When the comparator output is near the positive voltage supply potential, gate 40 is "off", but when the comparator output switches to ground potential gate 40 will turn "on". At that time warning tone from right-of-way warning tone source 50, gated through gate 40 will be coupled through coupling transformer 12 of the intercom signalling equipment 10 to the intercom calling party T & R leads and will then be heard by the calling party. The intercom signal originated by the calling party is not heard by the called party, the warning tone being transmitted to the calling party only to indicate what has happened. The calling party may then choose to hang up and attempt to call later or wait on the line until the "right-of-way" signal is complete. If the desired calling party becomes available the voltage conditions at right-of-way circuit 20 will change and an AC path will be available from the intercom signalling circuit through right-of-way circuit 20 and intercom select circuit 30 to the called station via amplifier 70.

While but a single embodiment of the present invention has been shown it will be obvious to those skilled in the art that numerous modifications of the present invention are possible without departing from the spirit of the present invention which shall be limited only by the scope of the claims appended hereto.

What is claimed is:

1. In a telephone system, a calling station, a called station including an associated amplifier circuit, selector means, selectively operable by said calling station to establish circuit connections to said amplifier, first signalling means including a tone signal source and circuit connections to said calling station, and a right-of-way circuit comprising: first gating means including a first terminal connected to said first signalling means and a second terminal connected to said selector means; said first gating means initially operated in response to connection to said tone signal source included in said first signalling means, to connect a signal circuit path from said tone signal source through said first signalling means to said called station amplifier through said selector means; as least one second signalling means connectible to said called station amplifier and to said first gating means second terminal through said selector means; and said first gating means further operated in response to connection of said second signalling means, to block said signal circuit path between said first signalling means and said called station amplifer.

2. A telephone system as claimed in claim 1 wherein: said first signalling means are operated to connect said calling station to said first gating means first terminal; said first gating means additionally operated in response to connection to said calling station through said first signalling means, to connect a signal circuit path from said calling station through said first signalling means to said called station amplifier through said selector means; and in response to connection of said second signalling means to said called station amplifier said first gating means further operated to block said signal circuit path between said calling station and said called station amplifier.

3. A telephone system as claimed in claim 1 wherein: there is further included third signalling means; second gating means connected between said third signalling means and said first signalling means; and a comparator circuit including input circuit connections to said first and second terminals of said first gating means and an output circuit connection to said second gating means; said comparator circuit operated in response to connection of said second signalling means to said called station amplifier, to operate said second gating means to conduct signals from said third signalling source to said calling station through said first signalling means.

4. A telephone system as claimed in claim 3 wherein: said comparator means comprise a comparator amplifier including a first input terminal connected through a first resistor to said first gating means first terminal and a second terminal connected through a second resistor to said first gating means second terminal and an output circuit connection extending to said second gating means.

5. A telephone system as claimed in claim 4 wherein: said comparator means further include filter means connected to said first and second input terminals of said comparator amplifier.

6. A telephone system as claimed in claim 5 wherein: said filter means comprise a capacitor 7. A telephone system as claimed in claim 1 wherein: there is further included a zener diode connected between said first signalling means and said first gating means first terminal.

* * * * *